No. 762,340. PATENTED JUNE 14, 1904.
R. NICHOLLS.
COOKING AND HEATING APPARATUS.
APPLICATION FILED JAN. 31, 1903.
NO MODEL.
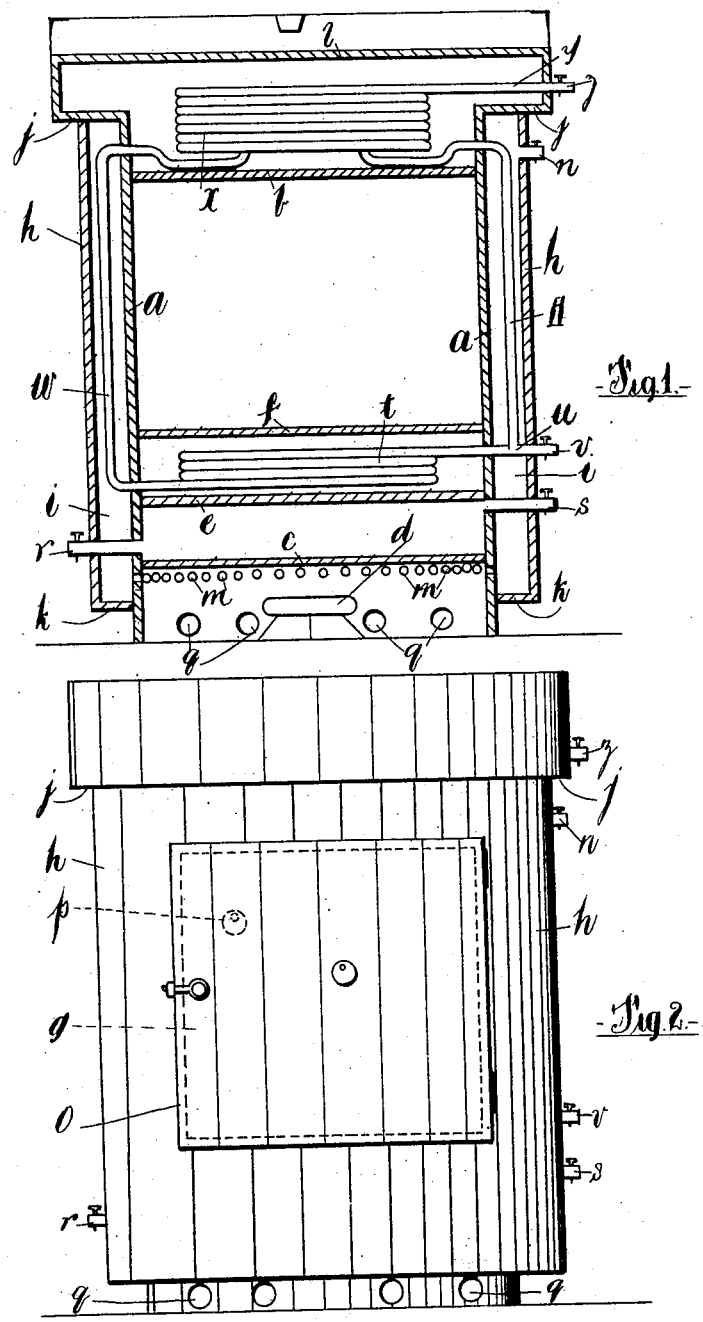

No. 762,340. Patented June 14, 1904.

UNITED STATES PATENT OFFICE.

RICHARD NICHOLLS, OF HOVE, ENGLAND.

COOKING AND HEATING APPARATUS.

SPECIFICATION forming part of Letters Patent No. 762,340, dated June 14, 1904.

Application filed January 31, 1903. Serial No. 141,392. (No model.)

*To all whom it may concern:*

Be it known that I, RICHARD NICHOLLS, a subject of the King of the United Kingdom of Great Britain and Ireland, residing at 106 Western road, Hove, in the county of Sussex, England, have invented new and useful Improvements in Cooking and Heating Apparatus, of which the following is a specification.

This invention relates to improvements in cooking and heating apparatus, the object being to obtain the maximum amount of heat from the minimum consumption of fuel. I attain this object by the apparatus illustrated in the accompanying drawings, wherein—

Figure 1 is a vertical section, and Fig. 2 a front view.

I provide an inner casing $a$, closed by a plate $b$ near its upper end and by another plate $c$ near its lower end. Below the plate $c$ is a source of heat $d$, which may conveniently be a gas-stove. Above the bottom plate $c$ are the two plates $e$ and $f$ at a suitable distance apart from one another and from the bottom plate $c$.

The inner casing $a$ has a door $g$ for affording access to the inside of the oven, which may be furnished with shelves and other conveniences for holding the articles to be cooked.

Surrounding the inner casing $a$ is an outer one, $h$, of sufficient diameter to leave an annular space $i$ between itself and the inner casing $a$. The outer casing $h$ extends beyond the top of the inner one, $a$, but not to the bottom of it, and the ends of the annular spaces are closed by the rings $j$ and $k$. The plate $l$ closes the top of the outer cylinder $h$, and above the plate $l$ is a gas or otherwise heated grill. Immediately above the bottom ring $k$ and below the bottom plate $c$ are a number of holes $m$ to allow heat to pass from the stove or other source $d$ into the annular space $i$, and an adjustable outlet $n$ for the heated air is provided in the upper part of the outer casing $h$.

In the outer casing $h$ is a door $o$ for giving access to the inner door $g$, and adjustable air-inlets $p$ are provided in the oven-door $g$ and others, $q$, round the space occupied by the stove $d$.

At the bottom of the space between the plates $c$ and $e$ is an adjustable cold-air inlet $r$, and on the other side is hot-air outlet $s$ just below the plate $e$. The inlet $r$ and outlet $s$ pass across the annular space $i$.

In the space between the plates $e$ and $f$ is a coil of metal piping $t$, one end, $u$, of which passes outward through the annular space and is provided with means $v$ for regulating the inlet of cold air. The other end of the pipe is continued upward, as at $w$, through the opposite side of the annular space $i$ and connected with one end of another coil, $x$, contained in the space between the end $b$ and the top plate $k$, the opposite end of this coil being continued outward through the outer casing $h$, as at $y$, and there provided by an adjustable hot-air outlet $z$. The coils $t$ and $x$ are further connected by a pipe A, passing up the annular space $i$.

What I claim as my invention, and desire to secure by Letters Patent, is—

In a cooking and heating apparatus an inner casing, an outer casing spaced from said inner casing, the outer casing extending from a point above the bottom of the inner casing to a point above the top of the latter: closures for the space between the casings: a plate closing the lower portion of the inner casing and located above the lower of said closures: a source of heat below said plate, the inner casing being provided with holes around the source of heat: a second plate spaced above said closing-plate forming therewith an air-heating chamber; the latter having a regulated inlet and outlet: a third plate spaced above said second plate forming therewith a chamber, a coil of pipe in said chamber and provided with a cold-air inlet: a closing-plate for the top of the inner casing, a plate spaced above said closing-plate forming therewith a chamber, a coil of pipe in the chamber and provided with a hot-air outlet: pipes between the inner and outer casing and connecting the two coils, the top of the outer casing being provided with an air-exit: and doors in said casings.

In testimony whereof I have signed my name to this specification in the presence of two subscribing witnesses.

RICHARD NICHOLLS.

Witnesses:
 ERNEST HARPER KEMPE,
 ARCHIBALD GREVETT.